United States Patent Office 3,787,438
Patented Jan. 22, 1974

1

3,787,438
4,6-DIHYDROXY-N,N'BIS(3-OXO-1-ISOINDOLINYL-IDENE)ISOPHTHALAMIDE AND SUBSTITUTION PRODUCTS
Daniel Walter Thomas, Somerville, N.J., assignor to American Cyanamid Company, Stamford, Conn.
No Drawing. Filed Mar. 13, 1972, Ser. No. 234,329
Int. Cl. C07d 27/50
U.S. Cl. 260—325                                5 Claims

ABSTRACT OF THE DISCLOSURE

The 4,6 - dihydroxy - N,N'bis(3 - oxo - 1 - isoindolinylidene) isophthalamides, both unsubstituted, and in which the isophthalic acid ring is substituted in the 2 and/or 5 position by independently, chlorine, bromine and lower alkyl, and in the isoindole rings in one or more of the 4, 5, 6, and 7 positions by chlorine or bromine are yellow compounds which in pigmentary size are excellent yellow pigments.

BACKGROUND OF THE INVENTION

This invention relates to new carbonylamidine compounds useful as yellow pigments which are represented by the tautomeric formulas:

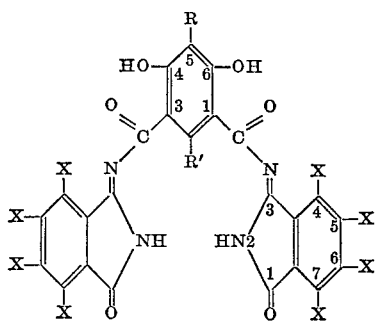

⇅

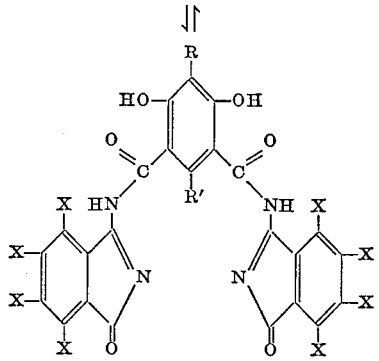

where R and R' each independently may be hdyrogen, chlorine, bromine or lower alkyl (1 to 2 carbon) and each X may independently be hydrogen, chlorine or bromine.

For purposes of convenience, the compounds and pigments comprising the compounds will be hereinafter discussed and named as if in the first tautomeric form.

2

PRIOR ART

U.S. Pat. 2,537,352, Jones, Jan. 9, 1951, discloses compounds of the formula:

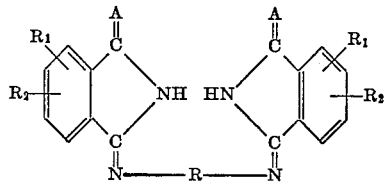

where A is O or S; R is a divalent aryl radical; $R_1$ is —H, —Cl, —OCH$_3$ or —NO$_2$; and $R_2$ is —H or —Cl. In these compounds the nitrogen is bonded directly to the aryl ring.

U.S. Pat. 2,973,358, Pugin, Feb. 28, 1961, discloses compounds of the formula:

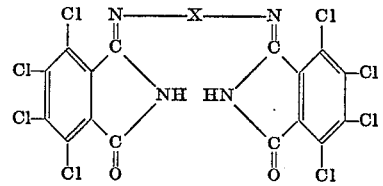

where =N—X—N= stands for di-iminoaryl. Here also the nitrogen is bonded directly to the aryl ring.

U.S. Pat. 3,332,966, Berry and Thomas, July 25, 1967, discloses bis-anthraquinonyl compounds of the formula:

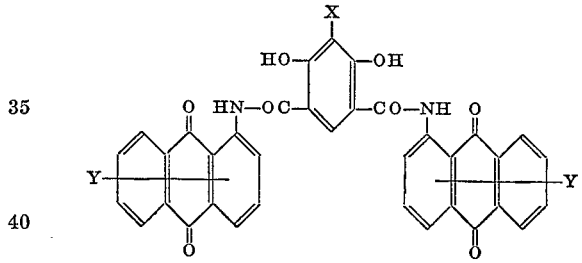

where each X may be H, Cl, Br or lower alkyl and each Y may be H, Cl, Br or lower alkyl at any unfilled position on a benzo ring of the anthraquinonyl radical.

Certain characteristics are necessary for compounds to be useful as pigments in typical applications including paints, lacquers, printing inks, dope-dyed fibers, plastics, and related compositions. These include shade or color or hue, high tinctorial strength, stability, light and weathering fastness, compatibility with various vehicles, and, particularly, insolubility or resistance to bleeding. Many products have been suggested or made which have satisfied one or more of these requirements but failed in others; failure in even one of the requirements but failed in others; failure in even one of the required properties results in a decrease in commercial interest or commercial failure for that product. In addition, the need for new shades of color makes necessary a constant search for new pigment products.

SUMMARY OF THE INVENTION

The present invention is based on the discovery that the carbonylamidines defined by the generic structure above are superior pigments of desirable shades of yellow with outstanding lightfastness, good color strength, high insolubility and resistance to bleeding, and other properties necessary for an excellent product.

This superiority is rather surprising since related derivatives are deficient in certain respects and not competitive commercially; for example, related compounds in which the isophthalamide ring bears no hydroxy groups show almost no color and are useless as pigments. The unique, specific structure shown by the generic formula is necessary to obtain the particularly desired shades of yellow color and superior properties exhibited by the products of this invention.

One method of preparation of our new pigments involves an acylation reaction; in this method, a 4,6-dihydroxy-isophthalic acid is converted to the acid chloride by means of a chlorinating agent, e.g. thionyl chloride, and reacted with a 3-iminophthalimidine. The di-acid chloride is usually formed prior to the addition of the iminophthalimidine, but it may be formed in its presence, the final reaction taking place directly. Conventional conditioning processes may be used for conversion of the crudes to pigmentary products such as grinding with or without the presence of a grinding aid, etc.; the pigments products may be used for practical purposes in lacquers, enamels, paints, printing inks, etc.

Among the 4,6-dihydroxyisophthalic acids which may be used to prepare the pigments of this invention are:

4,6-dihydroxyisophthalic acid
5-chloro-4,6-dihydroxyisophthalic acid
5-bromo-4,6-dihydroxyisophthalic acid
2,5-dichloro-4,6-dihydroxyisophthalic acid
2,5-dibromo-4,6-dihydroxyisophthalic acid
2-bromo-5-chloro-4,6-dihydroxyisophthalic acid
5-bromo-2-chloro-4,6-dihydroxyisophthalic acid
2-chloro-4,6-dihydroxyisophthalic acid
2-bromo-4,6-dihydroxyisophthalic acid
5-methyl-4,6-dihydroxyisophthalic acid
5-ethyl-4,6-dihydroxyisophthalic acid
2-methyl-4,6-dihydroxyisophthalic acid
2-ethyl-4,6-dihydroxyisophthalic acid
2-ethyl-5-methyl-4,6-dihydroxyisophthalic acid
5-ethyl-2-methyl-4,6-dihydroxyisophthalic acid
2,5-diethyl-4,6-dihydroxyisophthalic acid
2,5-dimethyl-4,6-dihydroxyisophthalic acid
2-chloro-5-ethyl-4,6-dihydroxyisophthalic acid
2-chloro-5-methyl-4,6-dihydroxyisophthalic acid
5-chloro-2-ethyl-4,6-dihydroxyisophthalic acid
5-chloro-2-methyl-4,6-dihydroxyisophthalic acid
2-bromo-5-ethyl-4,6-dihydroxyisophthalic acid
2-bromo-5-methyl-4,6-dihydroxyisophthalic acid
5-bromo-2-ethyl-4,6-dihydroxyisophthalic acid
5-bromo-2-methyl-4,6-dihydroxyisophthalic acid and mixtures thereof.

Examples of the iminophthalimidines or their salts which may be used in preparing the pigments of the invention include:

3-iminophthalimidine hydrochloride
3-imino-4,5,6,7-tetrachlorophthalimidine
3-imino-4,5,6,7-tetrabromophthalimidine
3-imino-5,6-dichlorophthalimidine
3-imino-4,7-dichlorophthalimidine
3-imino-5,6-dibromophthalimidine
3-imino-4,7-dibromo-5,6-dichlorophthalimidine
3-imino-5-chlorophthalimidine
3-imino-7-bromophthalimidine Details of all the variants within the scope of this invention would unduly prolong this specification.

For conversion of the crude compounds to pigmentary products, conventional conditioning processes may be used. The compound may be ground with or without a grinding aid such as micropulverized salt, or it may be ball-milled, or treated in a fluid energy mill to reduce the particle size to pigmentary sizes, using processes which are obvious to those skilled in the art.

Preferred compounds of the invention are the carbonylamidines obtained by reaction of 3-imino-4,5,6,7-tetrachlorophthalimidine with the acid chlorides of 4,6-dihydroxyisophthalic acid or 5-chloro-4,6-dihydroxyisophthalic acid.

The pigments of the invention all show desirable shades of yellow, but the shading towards red or green can be controlled by the type and amount of halogenation, affording desirable shades not otherwise obtainable in this general type of pigment. An increase in the amount of chlorine substitution in the molecule has the added benefit of an increase in insolubility and color strength.

The new pigments may be used as a pure compound, or mixed with each other, or in solid solution with each other, or mixed with other pigments, including particularly titanium dioxide, or zinc oxide in lacquers, enamels, paints, printing inks, resin formulations, dope-dyeing, as resin-bonded pigment for fabrics, and in other locations where a pigment having excellent light fastness, bleeding resistance, and a yellow color are desired.

As illustrative of this invention the following examples show methods of preparing the pigments of this invention, whereby the advantages of the pigment of the present invention are most readily understood.

All parts are by weight unless otherwise stated.

EXAMPLE 1

4,6-dihydroxy-N,N'-bis(3-oxo-1-isoindolinylidene) isophthalamide

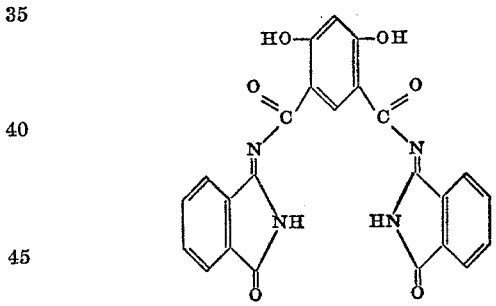

A slurry of six parts by weight of 4,6-dihydroxyisophthaloyl chloride and ten parts by weight of 3-iminophthalimidine hydrochloride in 150 parts by volume of nitrobenzene is heated to 190° C. over a period of 16 minutes. After reaching 190° C., it is allowed to cool to 100° C. The precipitate is filtered, washed with warm nitrobenzene (orange-yellow bleed), and then washed with 95% ethanol until there is essentially no bleeding. The yellow precipitate is then slurried in 400 parts by volume of boiling 95% ethanol, filtered hot, washed with 95% ethanol to no bleed, washed at room temperature with dimethylformamide to a constant orange-yellow bleed, washed with 95% alcohol to no bleed, and dried. A yield of 4.3 parts by weight, which is 37.4% of theory, of light green-shade yellow 4,6-dihydroxy-N,N'-bis(3-oxo-1-isoindolinylidene)isophthalamide is obtained.

The product is conditioned by placing 6 parts by weight of pigment, 600 parts by weight of one-eighth inch steel shot, and 100 parts by volum eof a 75% xylene-25% butanol solution in a round container of 237 parts by volume capacity and roller milling at about 70% the critical speed for 24 hours. The pigment slurry is then separated from the shot, filtered, and washed with 75% xylene-25% butanol to a constant bleed. About 5.5 parts by weight of conditioned pigment are thus obtained.

EXAMPLE 2

4,6-dihydroxy-N,N'-bis(4,5,6,7-tetrachloro-3-oxo-1-isoindolinylidene)isophthalamide

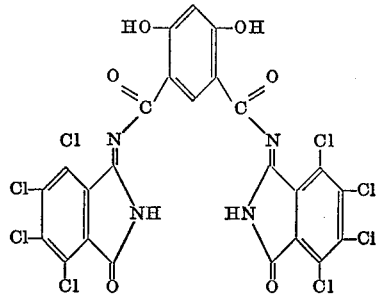

A slurry of 5.8 parts by weight of 4,6-dihydroxyisophthaloyl chloride and 14.0 parts by weight of 3-imino-4,5,6,7-tetrachlorophthalimidine in 200 parts by volume of nitrobenzene are heated to 205° C. over 30 minutes and then held at 205–6° C. for 35 minutes. The resulting slurry is filtered hot, and the red-yellow precipitate is washed with hot nitrobenzene to a yellow bleed. The cake thus obtained is washed with dimethylformamide at 100° C., hot 95% alcohol, again with dimethylformamide to no bleed, finally with hot 95% alcohol to no bleed, and then dried at about 80° C. The product consists of 8.7 parts by weight of red-shade yellow 4,6-dihydroxy-N,N' - bis(4,5,6,7 - tetrachloro-3-oxo-1-isoindolinylidene)isophthalamide which is 48.3% of the theoretical yield. The product is conditioned by the procedure given in Example 1 to give a pigment.

EXAMPLE 3

5-chloro-4,6-dihydroxy-N,N'-bis(4,5,6,7-tetrachloro-3-oxo-1-isoindolinylidene)isophthalamide A slurry of 5.0 parts by weight of 5-chloro-4,6-dihydroxyisophthaloyl chloride and 11.0 parts by weight of 3-imino-4,5,6,7-tetrachlorophthalimidine in 100 parts by volume of nitrobenzene is heated to 155° C. over 35 minutes and held at 153–8° C. for one hour. The precipitate is filtered hot, washed with nitrobenzene to a light yellow color, cooled, and washed with 3A alcohol. The filter cake is washed with hot dimethylformamide to no bleed, washed with hot 95% alcohol to no bleed, and dried at 90° C. A yield of 11.6 parts by weight of green-yellow 5 - chloro - 4,6-dihydroxy-N,N'-bis(4,5,6,7-tetrachloro-3-oxo-1-isoindolinylidene)isophthalamide is thus obtained which represents 81.7% of theory. The product is conditioned by the procedure given in Example 1 to obtain a pigment.

EXAMPLE 4

4,6-dihydroxy-N,N'-bis(4,5,6,7-tetrabromo-3-oxo-1-isoindolinylidene)isophthalamide A slurry of ten parts by weight of 4,6-dihydroxyisophthaloyl chloride and 39.3 parts by weight of 3-imino-4,5,6,7-tetrabromophthalimidine in 500 parts by volume of nitrobenzene is heated to 200° C. over 25 minutes and held at 200–203° C. for 30 minutes. The slurry is then filtered hot and washed with nitrobenzene at 150° C. until the filtrate is the color of nitrobenzene. The resulting filter cake is washed with dimethylformamide at room temperature to no bleed, then with 95% alcohol to no bleed, and finally dried at about 90° C. The product consists of 33.4 parts by weight of green shade yellow powdered 4,6-dihydroxy-N,N'-bis(4,5,6,7 - tetrabromo - 3-oxo-1-isoindolinylidene)isophthalamide which is 74% of theory. The product is conditioned by the procedure given in Example 1 to give a pigment.

The pigments of this invention compare favorably with known pigments, in having satisfactory pigment properties, and also afford shades of color not otherwise exhibited by the known pigments.

Other details of testing and evaluation of pigments are set forth in U.S. Pat. 3,332,966, supra, the details of which are herein incorporated by this reference thereto.

I claim:

1. An isophthalamide represented by the formula:

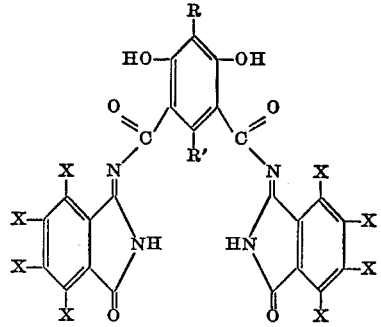

where R and R' are each independently hydrogen, chlorine, bromine or lower alkyl and each X is independently hydrogen, chlorine or bromine, and where the substituents on the two (3-oxo-1-isoindolinylidene) groups are the same.

2. The compound of claim 1 in which R and R' are both H and each X is H, and in one tautomeric form is 4,6-dihydroxy-N,N'-bis(3-oxo - 1 - isoindolinylidene)isophthalamide.

3. The compound of claim 1 in which R and R' are both H and each X is chlorine and in one tautomeric form is 4,6-dihydroxy-N,N'-bis(4,5,6,7-tetrachloro-3-oxo-1-isoindolinylidene)isophthalamide.

4. The compound of claim 1 in which R is chlorine, R' is H and each X is chlorine and in one tautomeric form is 5-chloro - 4,6 - dihydroxy-N,N'-bis(4,5,6,7-tetrachloro-3-oxo-1-isoindolinylidene)isophthalamide.

5. The compound of claim 1 in which R and R' are both H and each X is bromine, and in one tautomeric form is 4,6-dihydroxy-N,N'-bis(4,5,6,7-tetrabromo-3-oxo-1-isoindolinylidene)isophthalamide.

References Cited
UNITED STATES PATENTS 2,973,358    2/1961    Pugin _____ 260—325

JOSEPH A. NARCAVAGE, Primary Examiner

U.S. Cl. X.R.

106—288, 296; 260—37 R